Oct. 19, 1965 M. L. HENSEL 3,213,382

BROADBAND COUPLING TO COMB FILTER

Filed Sept. 3, 1963 3 Sheets-Sheet 1

COUPLING NETWORK

INVENTOR
M. L. HENSEL
BY
Sylvan Sherman
ATTORNEY

United States Patent Office 3,213,382
Patented Oct. 19, 1965

3,213,382

BROADBAND COUPLING TO COMB FILTER

Marion L. Hensel, Summit, N.J., assignor to Bell Telephone Laboratories, Incorporated, New York, N.Y., a corporation of New York Filed Sept. 3, 1963, Ser. No. 306,360
14 Claims. (Cl. 330—4)

This invention relates to electromagnetic wave devices and, in particular, to means for coupling from a low-dispersion transmission line to a high-dispersion, iterative filter structure for use in such devices.

It is generally the case that broadband matches to a high-dispersion, iterative filter, such as the comb-type, slow-wave structure used in a traveling wave maser, are arrived at more by experimentation and intuition than as a result of theory and analysis.

Typically, a simple probe will produce a satisfactory match to a comb filter over approximately one-third of the total bandwidth available from the comb filter. In United States Patent 3,074,023, issued to J. M. Apgar on January 15, 1963, there is described an arrangement for coupling between a coaxial cable and a comb structure which is capable of increasing the match from one-third to as much as three-quarters of the available bandwidth.

Since broadband matches are desirable in many instances, it is an object of this invention to further extend the range of frequencies over which a match can be obtained between a comb-type, slow-wave filter structure and a low-dispersion transmission line.

In accordance with the invention, broadband matching into and out of a comb-type, slow-wave filter structure is produced by widening the bandwidth of the filter at its ends. The matching section comprises a coupling probe and the first few elements of the iterative filter structure that have been modified to have a broader bandwidth than the rest of the filter. More specifically, the bandwidth of these first elements is tapered, from a maximum at the probe end, to a minimum, equal to that of the filter, at the other end of the matching section. The taper may be linear or exponential and, typically, extends over from two to four elements.

Alternatively, the first few elements of the filter can be considered to be a separate coupling network of tapered bandwidth interposed between the main filter and the coupling probe.

Broadbanding of the elements in the matching section is accomplished by separately increasing the upper cut-off frequency and decreasing the lower cut-off frequency. In the specific embodiments to be described in detail hereinafter, the quantity varied is the capacitance of the resonant circuit responsible for each cut-off frequency. It is reduced at the upper cut-off frequency and increased at the lower cut-off frequency. With other classes of iterative filter structures, it might be more convenient to alter the inductance or a combination of the capacitance and the inductance.

A filter in accordance with the invention would simultaneously employ means for raising the upper cut-off frequency and means for lowering the lower cut-off frequency. These means would typically be employed at both ends of the filter to permit broadband coupling into and out of the structure.

These and other objects and advantages, the nature of the present invention, and its various features, will appear more fully upon consideration of the various illustrative embodiments now to be described in detail in connection with the accompanying drawings, in which.

Figure 1:
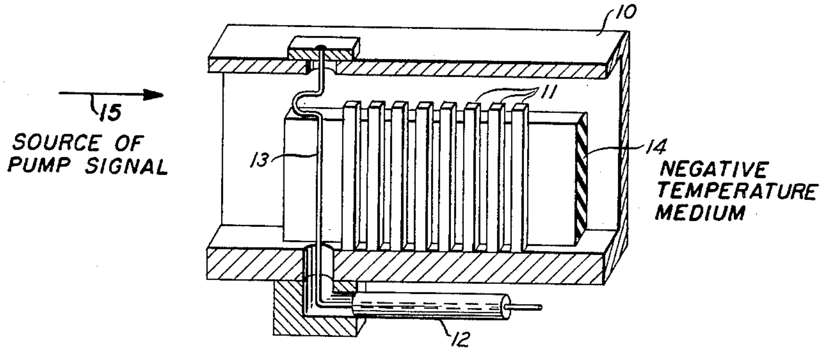
FIG. 1 PRIOR ART
FIG. 1 shows the prior art method of coupling between a transmission line and a comb-type, slow-wave structure.

Referring to FIG. 1, there is shown a comb-type, slow-wave filter structure and the most common prior art method of coupling to it from a coaxial transmission line. The slow-wave structure comprises a conductive housing 10 in which there is mounted an array of equally spaced conductive rods 11 one end of each of which is conductivity connected to the housing. Dielectric loading of the comb is obtained by placing slabs of a suitable dielectric material 14 between the rods and opposite walls of the housing. In a traveling wave maser of the type described in United States Patent No. 3,044,225, issued to R. W. De Grasse and E. O. Schulz-DuBois on October 10, 1961, the housing 10 is a section of rectangular waveguide and the rods extend in a direction perpendicular to the narrow walls of the guide. The dielectric loading in a maser is primarily produced by the negative temperature medium, typically ruby. A source of pumping signal, represented by the arrow 15, is also provided to pump medium 14.

Electromagnetic wave energy is coupled into the slow-wave structure from a coaxial transmission line 12 by means of a preshaped coupling probe 13 which is connected to the center conductor of coaxial line 12. The coupling probe is positioned near the first rod of the comb and has a shape which is arrived at experimentallly. By shifting the probe a little closer to or further from the first comb rod, the position of best match can be adjusted somewhat toward higher or lower frequencies.

This type of coupling arrangement produces a match which has a return loss of 20 decibels or better over about one-third of the bandwidth of the comb structure.

The difficulty with the coupling arrangement shown in FIG. 1 is that it attempts to couple a highly dispersive circuit to a transmission line having an impedance of low or zero dispersion with a single nondispersive element. This approach leads to a narrow-band match since the impedance ratio varies rapidly with frequency, whereas the coupling device can compensate for only one impedance ratio. Rather, a broadband match requires some high dispersion in the matching device itself so that appropriate impedance ratios can be realized at two or more frequencies within the pass band.

A simplified explanation of the matching principle employed herein starts with the observation that the typical prior art narrow-band match is good over about a third of the pass band. If the pass band is increased threefold, then a match good over a third of the increased band would be good over the entire original bandpass. In practice, however, the increase in bandwidth need not be as great as this. In one filter tested in which the bandwidth was tapered over four comb rods, an increase in frequency of only 50 percent was found to be adequate.

Recognizing that the field configurations for a comb structure are distinctly different at the upper and lower cut-off frequencies, it is more convenient to discuss separately the means for raising the upper cut-off frequency and the means for lowering the lower cut-off frequency.

Figure 2:
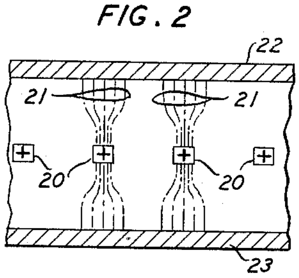
FIGS. 2 and 3 show the electric field distribution for the comb structure at the lower and upper cut-off frequencies, respectively.

FIG. 2 is a side view of a portion of a comb structure showing the open-circuit end of the comb rods and the electric field configuration at the lower cut-off frequency. The "+" designation on each of the rods 20 indicates an in-phase relationship for the wave energy. Because of this, the electric field extends from each of the rods to the housing walls 22 and 23 as indicated by the electric field lines 21.

Figure 3:
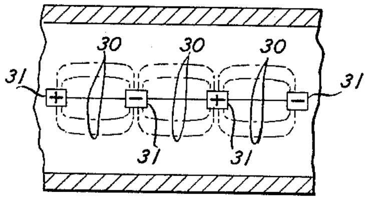

At the upper cut-off frequency, adjacent rods are 180 degrees out of phase and the electric field distribution is as shown in FIG. 3. As illustrated, the electric field lines 30 extend between adjacent rods 31 with substantially no electric field in the region of the housing.

In view of these distinctly different electric field configurations, the lower cut-off frequency can be lowered, without substantially affecting the upper cut-off frequency, by operating upon the slow-wave structure in the vicinity of the housing, whereas the upper cut-off frequency can be raised, without substantially affecting the lower cut-off frequency, by operating upon the slow-wave structure in the region between rods. Examples of various arrangements for achieving these results are illustrated in FIGS. 4 through 10.

Figure 4:
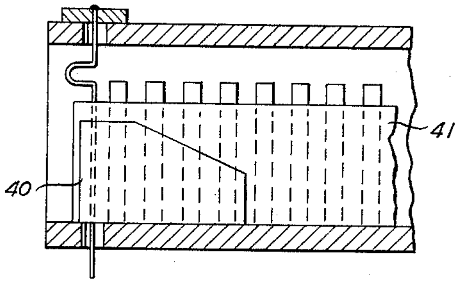
FIGS. 4, 5, 6 and 7 show various arrangements for lowering the lower cut-off frequency at the input (and output) ends of the comb structure.
Figure 5:
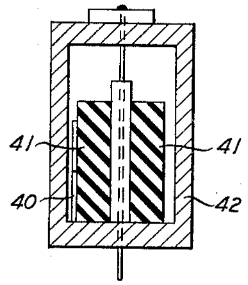

FIG. 4 shows one method of lowering the lower cut-off frequency of a section of a comb structure which comprises inserting a tapered shim 40 between the dielectric loading material 41 and the housing. This is more clearly shown in FIG. 5 which is an end view of the slow-wave structure showing the shim 40 inserted between the dielectric material 41 and the housing 42. It has been found experimentally that the shim may be either metallic or dielectric since either material tends to increase the capacitance between the rods and the housing. By tapering the shim, as seen in FIG. 4., the capacitance increase is less for the inner rods and, hence, the bandwidth of the comb structure is likewise tapered. It has been further found that the tapering is advantageously extended over from two to four rods.

Figure 6:
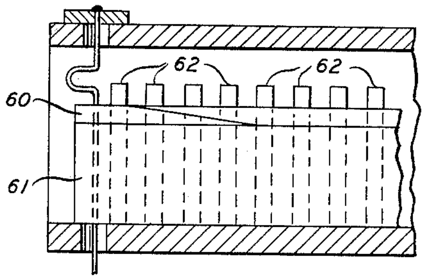
Figure 7:
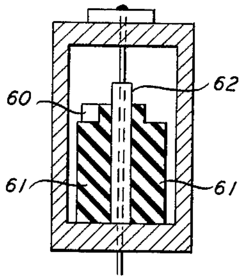

If dielectric loading is produced by active material, as in a traveling wave maser, the dielectric material is often narrowed in step-like fashion at the rod ends. If this is so, the lower cut-off frequency can be conveniently lowered by placing a tapered wedge 60 into the step in the dielectric material 61 as shown in FIGS. 6 and 7. Here again, the wedge can be of dielectric material or it can be metallic. Fig. 6 shows the wedge 60 located near the open-circuit end of rods 62 and tapered over an interval which includes four rods. FIG. 7 is an end view, showing the wedge 60 positioned in the step of the dielectric material 61.

Because a traveling wave maser is typically operated at a low temperature, it is advantageous to make the wedge out of the same material as the maser material. So constructed, the wedge and the maser material have the same thermal coefficient of expansion and there is no tendency for the two to separate when cooled after they have been bonded together. On the other hand, it has been found that the electric properties of a metallic wedge are preferable. Accordingly, in a preferred embodiment the dielectric wedge is copper coated thereby combining the thermal properties of the dielectric material and the electrical properties of a metallic wedge.

Figure 8:
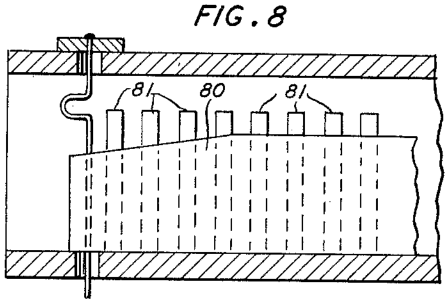
FIGS. 8, 9 and 10 show various arrangements for raising the upper cut-off frequency at the input (and output) ends of the comb structure.
Figure 9:
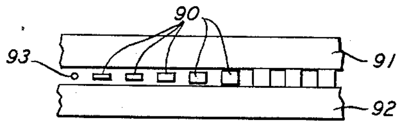
Figure 10:
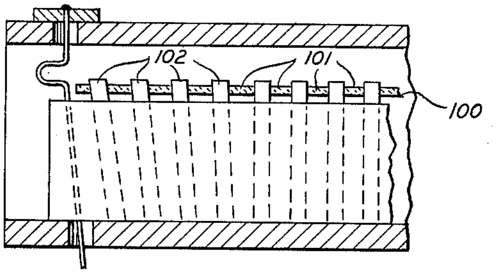

Arrangements for gradually raising the upper end of the bandpass are illustrated in FIGS. 8 to 10. In FIG. 8 the height of the dielectric material 80 in immediate contact with the first few rods 81 is tapered with maximum reduction in height and, hence, maximum raising of the cut-off frequency, occurring at the first rod.

In the embodiment of FIG. 9, the rod-to-rod capacitance is reduced by gradually reducing the width of the end rods 90 so that they do not completely fill the space between the slabs of dielectric material 91 and 92. The rod immediately adjacent to the coupling probe 93 is narrowest. From this minimum width, the rods gradually increase to full width over an interval of five rods.

In the embodiment of FIG. 10 bandwidth tapering is achieved by gradually increasing the distance between adjacent rods at the two ends of the comb structure. This can be done either by means of a nonuniform comb in which the rod-to-rod spacing at the comb ends is gradually increased or a uniformly spaced comb structure can be modified by bending the rods. This increases the distance between adjacent rods unevenly, with maximum spacing occurring at their open-circuited ends. As a matter of practice, the latter arrangement is preferred.

As disclosed in the copending application of F. S. Chen, M. L. Hensel, B. C. Hiatt and E. O. Schulz-Du Bois Serial No. 223,585, filed September 12, 1962, ceramic spacers are used to maintain a uniform spacing of the rod ends. In accordance with the instant invention the ceramic spacer 100 is fabricated so that the gap 101 between adjacent rods 102 is gradually increased at the comb ends. Typically, the change in spacing is so small that it is not perceptible to the unaided eye. For example, present models of the L-band maser have a nominal rod spacing of 40 mils. A 50 mc./sec. increase in the upper cut-off frequency is realized in such a maser by increasing the spacing between the five end rods to 40.3, 40.7, 41.5 and 43 mils, respectively.

Figure 11:
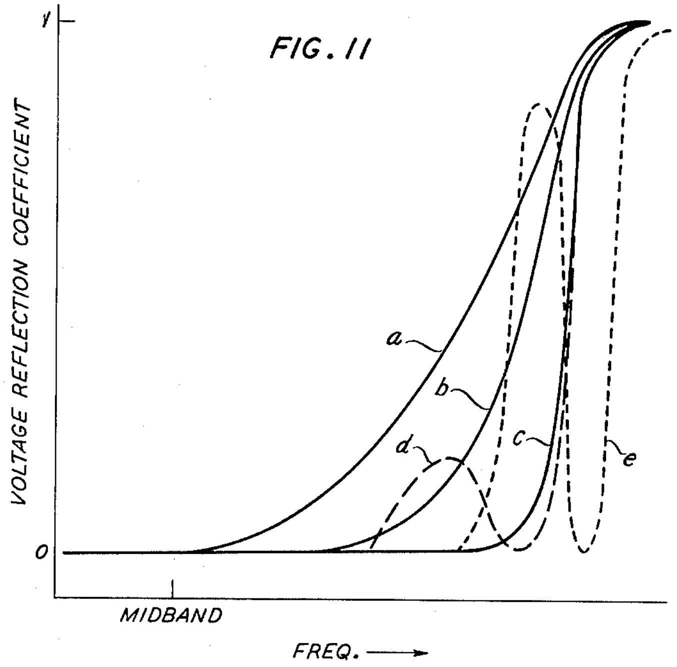
FIG. 11 shows the reflection as a function of frequency for various conditions of match at the coupling circuit.

The empirical procedure for establishing an optimum taper may be discussed with the aid of FIG. 11. It shows typical reflectometer tracings for the upper half of the pass bad as they appear during a typical matching procedure. Curves *a* through *e* are obtained with increasing tapering of the pass band by, for example, progressively widening the distances between the ends of the first few comb rods (FIG. 10). Curve *a* shows the original match (equal spacing); *b* is typical of an undercompensated match; *c* shows optimum broadbanding, while the extra hump in *d* indicates overcompensation. With even greater spacings, a sharp resonance is obtained as in *e*. Corresponding statements apply to the lower half of the pass band where the reflectomer tracings would be a mirror image of those shown in FIG. 11. The effectiveness of vairous band widening schemes for matching purposes is best investigated by means of a series of reflectometer tracings similar to those shown in FIG. 11.

To match a comb structure employing rod spacing, the probe shape and spacing are first adjusted to give a good match at midband. The optimum spacings between the comb rods in the taper is then determined using controlled rod bending under a microscope. After insertion of a ceramic rod spacer, machined to the optimum dimensions, it may be necessary to readjust the probe spacing to recover the good match at midband.

Figure 12:
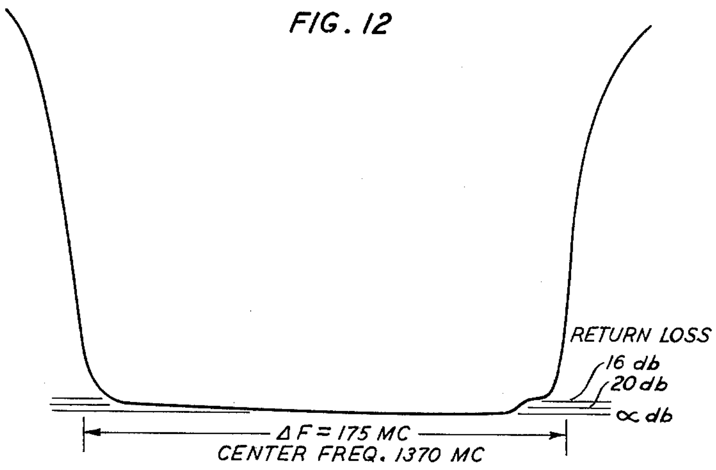
FIG. 12 shows the bandpass characteristic of the coupling circuit when properly matched in accordance with the invention.

To adjust the low end of the band, a tapered wedge or shim is inserted until the reflection diagram for the lower half of the pass band assumes the optimum, nearly square shape. The wedge or shim is then epoxy bonded in place. A typical tracing obtained after this procedure is reproduced in FIG. 12. It indicates a return loss of 20 decibels (VSWR=1.2) or better over 90 percent of the 175 mc. pass band. The edges of the pass band here were identified with points of about 100 decibel transmission loss. The frequency widening at the first comb rod amounts to about ±50 mc.

The appearance of a well-resolved resonance as a consequence of excessive band widening (see curve *e* in FIG. 11) leads to an interesting observation. The resonance condition at frequency *f* is approximately $$\sum_{n}\theta_n(f)=\pi$$

for a single resolved resonance near the lower cut-off frequency and $$\sum_{n}[\pi-\theta_n(f)]=\pi$$

for a resonance near the upper cutoff. Here $\theta_n$ is the phase shift between filter element $n-1$ and $n$ and $f$ is a frequency contained in the transmission band of the widened taper section, but not in the regular structure bandwidth. In the matching technique, however, resonances are to be avoided. This means that in actual matching tapers, the indicated sums are always smaller than $\pi$. This suggests two interesting conclusions. One is that the amount of tapering permissible is limited with respect to both the number N of filter elements involved and the frequency widening. More frequency width can be employed in a design if the number of affected filter elements is less and vice versa. This was verified experimentally when it was found that a 60 percent increase in frequency at each end led to an optimum match if the frequency taper extended over 2.5 fingers whereas a 30 percent increase was best when taperd over about five fingers. These values, however, were found not to be critical. That is, highly satisfactory results were obtained in the first instance when the frequency taper extended over as little as 1.5 fingers and as much as 3.5 fingers. The other observation is that, outside the regular pass band, the taper section is reactive and hence leads to perfect reflection outside the regular structure pass band. The small loss present in reality alters this only insignificantly.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departig from the spirit and scope of the invention.

What is claimed is:

1. A traveling wave maser comprising:
a negative temperature medium;
an energy source for pumping said medium;
a first section of slow-wave comb structure disposed adjacent to said medium;
said first section of comb structure characterized by a given bandwidth;
a source of signal wave energy to be amplified;
means for coupling said signal source to said first section of comb structure comprising a conductive probe and a second section of comb structure;
said second section of comb structure comprising a plurality of conductive posts of equal lengths interposed between and coupled to said probe at one end and said first section at its other end;
characterized in that said second section has a gradually increasing bandwidth which is maximum at said one end and tapers to a minimum equal to said given bandwith at said other end.

2. A combination for use in an electromagnetic wave transmission system, including:
a comb-type slow-wave structure comprising;
a conductive housing,
a coplanar array of rods longitudinally distributed within said housing wherein each rod has one end short-circuited to said housing and the other end open-circuited, and wherein each rod is equally spaced from the next adjacent rod at said short-circuited end,
dielectric loading material disposed between said rods and said housing;
and means for coupling electromagnetic wave energy into said slow-wave structure comprising a coupling probe extending into said housing adjacent to said array of rods;
said structure having a main section of uniform electrical properties and a coupling section, disposed between said main portion and said coupling probe, of varying electrical properties;
characterized in that the capacitance between the respective rods of said coupling section and said housing gradually increases from a minimum for the rod adjacent to said main section to a maximum for the rod adjacent to said probe;
and in that the rod-to-rod capacitance between adjacent rods of said coupling section gradually decreases from a maximum for the rods nearest said main section to a minimum for the rods nearest said probe.

3. The combination according to claim 2 wherein the capacitance between the rods in said coupling section and said housing is increased by means of a tapered shim disposed between said dielectric loading material and said housing,
said shim being widest at the end of said coupling section nearest said probe and gradually narrowing as it extends over said rods.

4. The combination according to claim 3 wherein said shim is metallic.

5. The combination according to claim 3 wherein said shim is made of dielectric material.

6. The combination according to claim 2 wherein said dielectric loading material narrows in step-like fashion at the open-circuited end of said rods and wherein the capacitance between the rods in said coupling section and said housing is increased by means of a tapered wedge disposed within the step in said material,
said wedge being widest at the end of said coupling section nearest said probe and gradually narrowing as it extends over said rods.

7. The combination according to claim 6 wherein said wedge is metallic.

8. The combination according to claim 6 wherein said wedge is made of dielectric material.

9. The combination according to claim 6 wherein said wedge is a metallic coated dielectric material.

10. The combination according to claim 2 wherein the rod-to-rod capacitance is decreased by decreasing the height of said dielectric loading material in the region of said coupling section,
the height of said material being minimum at the rod adjacent to said probe.

11. The combination according to claim 2 wherein the rod-to-rod capacitance is decreased by gradually reducing the width of the rods in said coupling section,
the rod adjacent to said probe being the narrowest.

12. The combination according to claim 2 wherein the rod-to-rod capacitance is decreased by gradually increasing the spacing between the open-circuited ends of the rods of said coupling section,
The distance between rods being greatest at the end of said coupling section adjacent to said probe.

13. For use in electromagnetic wave transmission apparatus, the combination including:
a comb-type slow-wave structure comprising;
a conductive housing, and
a plurality of spaced coplanar rods longitudinally distributed within said housing,
said structure including a main section, having a given upper cut-off frequency and a given lower cut-off frequency, and an outer section,
said outer section having an upper cut-off frequency which increases from said given upper cut-off frequency at one end adjacent to said main section to a higher upper cut-off frequency at the other end,
said outer section having a lower cut-off frequency which decreases from said given lower cut-off frequency at said one end to a lower lower cut-off frequency at said other end;
and a probe located adjacent to the other end of said outer section for coupling electromagnetic wave energy into said structure.

14. For use in an electromagnetic wave transmission system, a comb filter structure comprising:
a plurality of conductive posts of equal lengths;
said filter having an inner section of uniform bandwidth and outer matching sections;

said matching sections having tapered parameters for gradually increasing the bandwidth of said matching sections;

and means for coupling electromagnetic wave energy into and out of said outer sections.

References Cited by the Examiner

UNITED STATES PATENTS

| | | | |
|---|---|---|---|
| 2,708,236 | 5/55 | Pierce | 333—31 |
| 2,865,008 | 12/58 | Kock | 333—98 |
| 2,899,597 | 8/59 | Kompfner | 315—3.6 |
| 2,912,695 | 11/59 | Cutler. | |
| 2,942,142 | 6/60 | Denck | 315—3.5 |
| 3,004,225 | 10/61 | De Grasse | 330—4 |
| 3,074,023 | 1/63 | Apgar | 330—4 |
| 3,076,148 | 1/63 | Du Bois et al. | 330—4 |
| 3,090,925 | 5/63 | Adler et al. | 315—3.6 |

OTHER REFERENCES

De Grasse, Bell System Tech. Journal, March 1959, pages 305–334.

De Grasse, Kostelnick and Scovice, Bell System Tech. Journal, vol. 40, July 1961, pages 1117–1128.

HERMAN KARL SAALBACH, *Primary Examiner.*